US007204237B2

(12) United States Patent
Booms et al.

(10) Patent No.: US 7,204,237 B2
(45) Date of Patent: Apr. 17, 2007

(54) EVAPORATIVE SYSTEM LEAK DETECTION UPON REFUELING

(75) Inventors: Chris J Booms, Milford, MI (US); Roger C Sager, Munith, MI (US); William B Blomquist, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 203 days.

(21) Appl. No.: 11/100,848

(22) Filed: Apr. 7, 2005

(65) Prior Publication Data

US 2006/0229796 A1 Oct. 12, 2006

(51) Int. Cl.
*F02M 33/02* (2006.01)
*F02B 77/08* (2006.01)
*G01M 3/04* (2006.01)
*G01M 19/00* (2006.01)

(52) U.S. Cl. .................. 123/518; 123/198 D; 73/49.7; 73/118.1; 701/31; 701/36

(58) Field of Classification Search ............ 123/179.3, 123/179.4, 198 D, 516–520; 701/29, 31, 701/36; 73/40, 116, 49.7, 118.1, 149, 301, 73/304 C, 309, 290 R; 220/86.2, 203, 203.05, 220/746, 203.06, 303, 304, 288, 366, 367, 220/202.01, DIG. 33; 340/425.5, 435, 438, 340/439, 450, 450.2, 451, 457
See application file for complete search history.

(56) References Cited

U.S. PATENT DOCUMENTS 5,451,927 A * 9/1995 Thompson .................. 340/457
5,572,981 A * 11/1996 Pfleger et al. .............. 123/520
5,765,538 A * 6/1998 Krimmer et al. ........... 123/516
6,202,478 B1 3/2001 Blomquist et al. ........... 73/49.7
6,285,934 B1 * 9/2001 Shaw .......................... 701/36
6,823,850 B1 11/2004 Hurley ....................... 123/518
7,005,975 B2 * 2/2006 Lehner ....................... 340/438
2003/0150417 A1 * 8/2003 Miwa ...................... 123/179.4

FOREIGN PATENT DOCUMENTS

JP 2000146666 A * 5/2000
JP 2000170609 A * 6/2000

* cited by examiner

*Primary Examiner*—Willis R. Wolfe, Jr.
(74) *Attorney, Agent, or Firm*—Thomas A. Jurecko

(57) ABSTRACT

A loose or missing fuel cap detection method for an evaporative emission control system of an automotive vehicle detects a loose or missing fuel cap based in part on whether fuel level changed. The method determines whether the fuel level changed, which is indicative of a refueling event. The method then determines if one or more leaks are present. If the fuel level changed and one or more leaks are present, the method determines that the fuel cap is loose or missing.

11 Claims, 4 Drawing Sheets

EVAPORATIVE SYSTEM LEAK DETECTION UPON REFUELING

FIELD OF THE INVENTION

The present invention relates to evaporative systems for automotive vehicles, and more particularly to determining if a leak in an evaporative system is caused by a loose fuel cap.

BACKGROUND OF THE INVENTION

Modern automotive vehicles include a fuel tank and an evaporative emission control system that collects fuel vapors generated in the fuel tank. The evaporative emission control system includes a vapor collection canister that collects and stores fuel vapors. The canister, which is typically a carbon canister that contains an activated charcoal mixture, collects fuel vapors which accumulate during refueling of the vehicle or from increases in fuel temperature. The evaporative emission control system also includes a purge valve placed between an intake manifold of an engine of the vehicle and the canister. The purge valve is opened by an engine control unit in order to purge the canister. The collected fuel vapors are drawn into the intake manifold from the canister for combustion within a combustion chamber of the engine.

Vehicle diagnostic systems monitor certain performance and functionality characteristics of the evaporative emission control system. For example, the vehicle diagnostic system may determine if a leak exists in the system. Although a leak may result from damage to one or more components in the system, a loose fuel cap is a common cause of system leaks that is easily corrected.

SUMMARY OF THE INVENTION

A fuel level change detection method for an automotive vehicle comprises shutting off an engine of the automotive vehicle. An initial fuel level that is indicative of a fuel level in a fuel tank of the automotive vehicle is stored. The engine is turned on. After a delay of a first period, a current fuel level is determined. A fuel level change based on the initial fuel level and the current fuel level is calculated. It is determined if the fuel level change is greater than or equal to a fuel change threshold. Data that indicates that a refueling event occurred is stored if the fuel level change is greater than or equal to the fuel change threshold.

In another aspect of the invention, a loose or missing fuel cap detection method for an evaporative emission control system of an automotive vehicle comprises running a fuel level change diagnostic to determine if a refueling event occurred. It is determined if one or more cold start conditions are met. One or more leak tests are run on the system to determine if one or more leaks is present. Data that is indicative of a loose or missing fuel cap is stored if the one or more leaks is present and the refueling event occurred.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
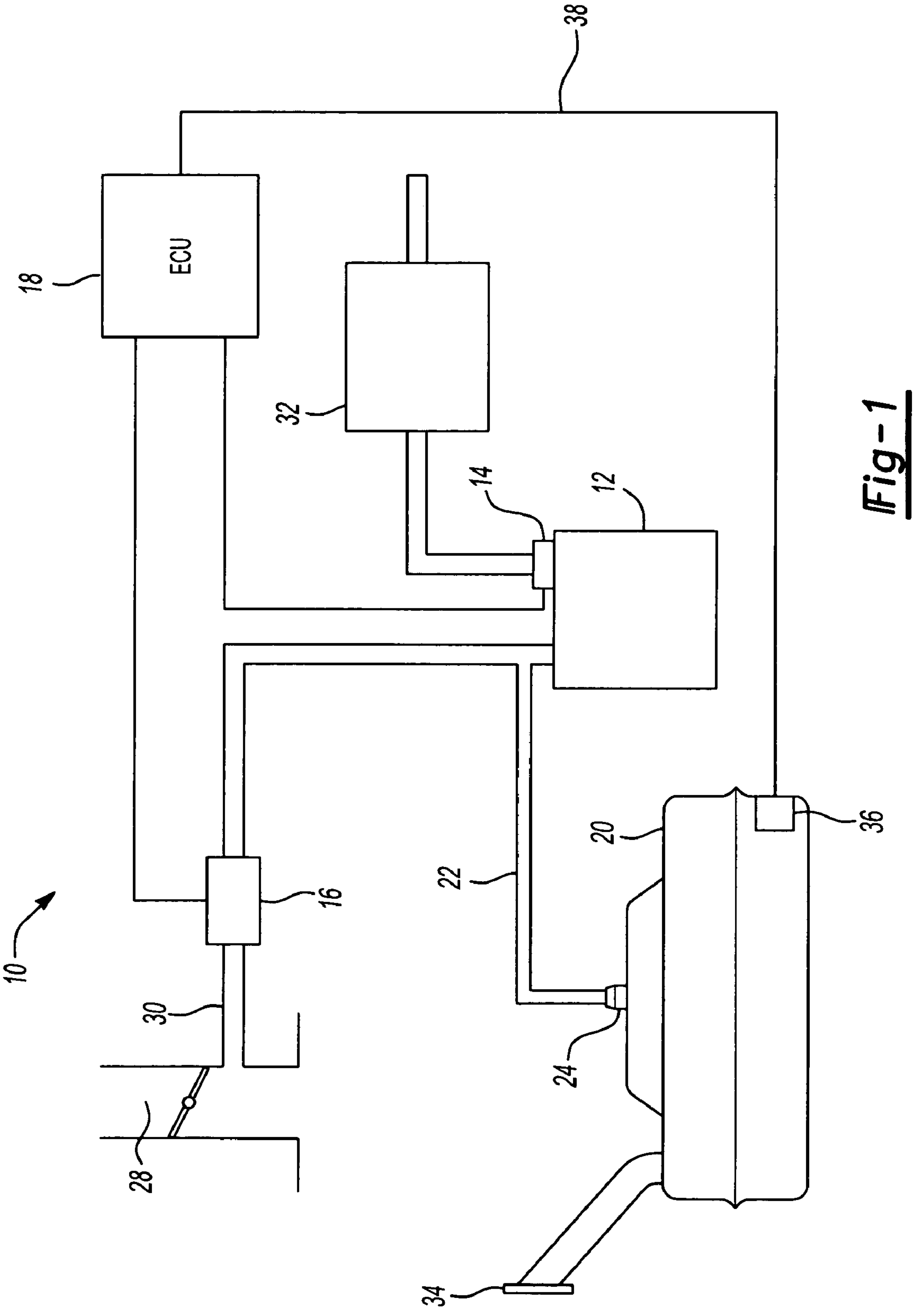
FIG. 1 is a functional block diagram of an evaporative emission control system according to the present invention.

Referring to FIG. 1, an evaporative emission control system 10 for an automotive vehicle is shown. The evaporative emission control system 10 includes a canister 12, a vacuum switch and valve assembly 14, a purge valve 16, and a controller 18. The controller 18, such as a vehicle engine control unit (ECU), communicates with the vacuum switch and valve assembly 14 and the purge valve 16. An exemplary vacuum switch and valve assembly 14 is described in U.S. Pat. No. 6,823,850, entitled, "Evaporative Emission System Integrity Module," which is hereby incorporated by reference in its entirety. The vacuum switch and valve assembly 14 includes a valve that is biased open or closed according to vacuum or pressure in the system 10. The controller 18 communicates with the vacuum switch and valve assembly 14 to determine whether the valve is open or closed. For example, the vacuum switch and valve assembly 14 includes a switch that sends a signal to the controller 18 that is indicative of the position of the valve.

The controller 18 controls the vacuum switch and valve assembly 14 and the purge valve 16 and performs diagnostic procedures on the control system 10 according to the method of the present invention to be described herein. It is to be understood that other suitable components that include valves and/or switches, such as a leak detection pump and valve assembly, may be used in place of the vacuum switch and valve assembly 14. An exemplary leak detection pump and valve assembly is described in more detail in U.S. Pat. No. 6,202,478, entitled "Evaporative System Leak Detection Feature After A Refueling Event," which is hereby incorporated by reference in its entirety.

A fuel tank 20 is connected to the canister 12 by a conduit 22 and a vapor flow control valve 24. The canister 12 is connected to an intake manifold 28 by a conduit 30. The purge valve 16 is mounted on the conduit 30. A remote filter 32 is connected to the vacuum switch and valve assembly 14 and the atmosphere.

A supply of liquid fuel for powering an engine of the automotive vehicle is placed in the fuel tank 20, usually by removing a fuel cap 34. As fuel is pumped into the fuel tank 20 or as the temperature of the fuel increases, vapors from the fuel pass through the conduit 22 to the canister 12. The purge valve 16 is normally closed. Under certain operating conditions conducive to purging, the controller 18 operates the purge valve 16 such that a certain amount of engine intake vacuum is delivered to the canister 12, causing the collected vapors to flow from the canister 12 through the conduit 30 and the purge valve 16 to the intake manifold 28. The vapor then flows into the combustion chambers for combustion.

The controller 18 is operable to determine leaks in the system 10. For example, damage to the fuel tank 20 and/or to one or more of the conduits 22 and 30 may result in a leak. A system leak may affect vehicle performance as well as emission levels, so detection and identification of such a leak is desirable. In the present invention, the controller 18 determines if a system leak is caused by a loose or missing fuel cap 34. The fuel cap 34 is in fluid communication with the system 10. Therefore, any fuel vapors escaping the system 10 through the fuel cap 34 may affect the performance of the system 10. Because liquid fuel, as well as fuel vapors, may affect leak detection methods, the controller 18 monitors the level of liquid fuel in the fuel tank 20. The fuel tank 20 includes a fuel level detection device 36. For example, the fuel level detection device 36 may be one of a slider and/or float device as are known in the art. The fuel level detection device 36 generates a fuel level signal 38 that is indicative of the fuel level and communicates the signal 38 to the controller 18.

The controller 18 determines whether the fuel level has changed according to the signal 38. More specifically, the controller 18 stores data indicative of the fuel level in order to determine if fuel was added to the fuel tank 20 since the previous fuel level was stored. If the controller 18 determines that the fuel level increased, it can be assumed that the fuel cap 34 was removed from the fuel tank 20. Therefore, if a system leak is present, the controller 18 determines that the fuel cap 34 is responsible for the leak, and subsequently warns the driver that the fuel cap 34 may be loose or missing.

Figure 2:
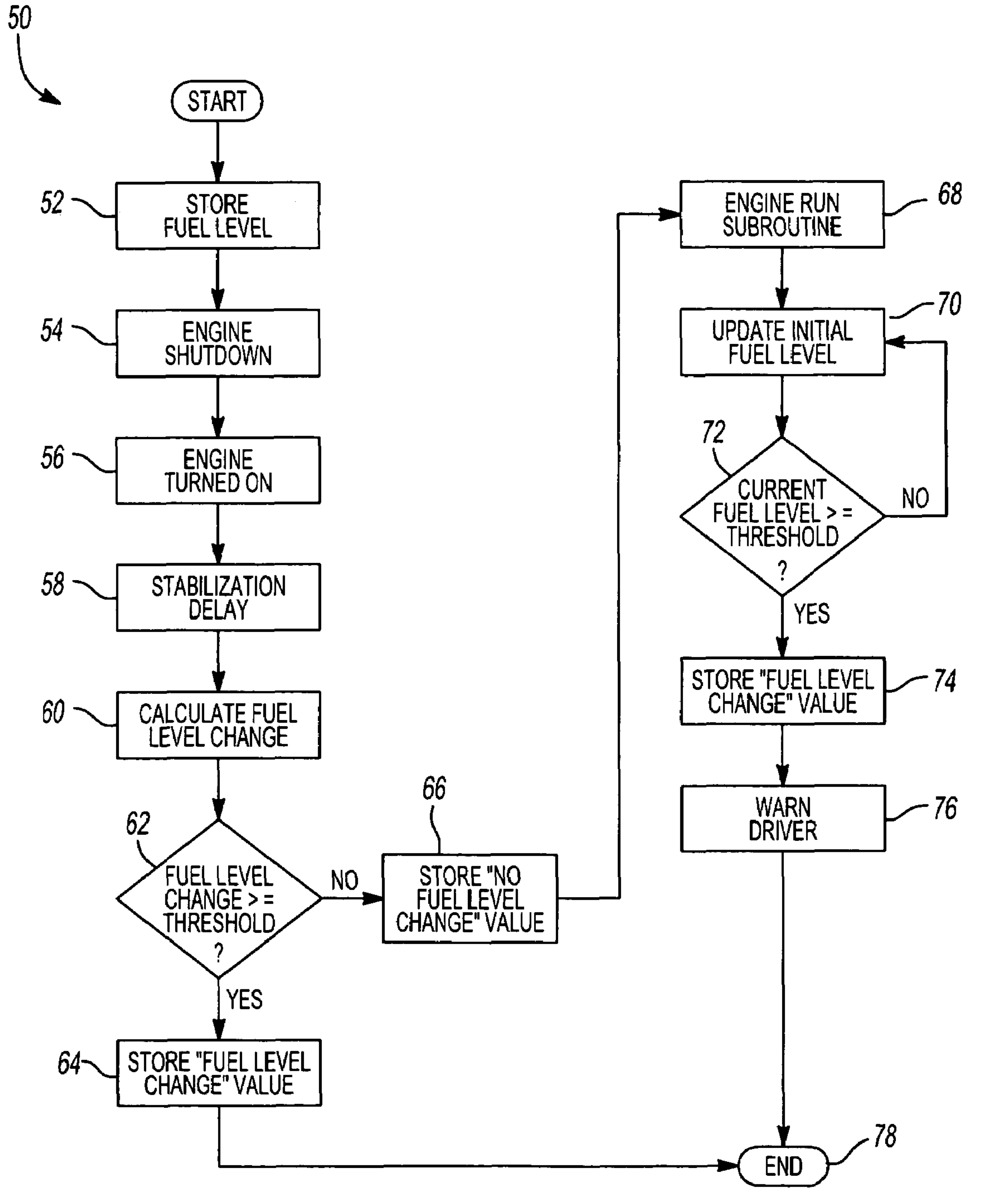
FIG. 2 is a flow diagram of a fuel level change detection method according to the present invention.

Referring now to FIG. 2, a fuel level change detection method 50 is shown. At step 52, the controller stores an initial fuel level value. In the preferred embodiment, the controller stores the initial fuel level value at engine shutdown. At step 54, engine shutdown occurs. At step 56, the engine is turned on at a subsequent time. At step 58, the controller delays according to a stabilization timer in order to allow the fuel level to stabilize. For example, if fuel was added to the fuel tank, the fuel level detection device may require a delay in order to accurately detect the increased fuel level. At step 60, the controller determines the new fuel level value and calculates a change between the initial fuel level value and the new fuel level value. For example, the controller subtracts the initial fuel level value from the new fuel level value. At step 62, the controller determines if the fuel level change is greater than or equal to a threshold. For example, the threshold may be a particular percentage, such as 20 percent, above the initial fuel level. In this manner, the controller will not diagnose a loose or missing fuel cap due to slight changes in the fuel level. If the fuel level change is greater than or equal to the threshold, the controller stores a value that indicates that the fuel level changed at step 64. If the fuel level change is not greater than or equal to the threshold, the controller stores a value that indicates the fuel level did not change at step 66 and continues to step 68. Further, the fuel level change may be positive or negative. For example, the controller may determine that fuel was removed from the fuel tank.

At step 68, the controller begins an iterative engine run subroutine that continues to monitor the fuel level while the engine is running to determine if the fuel level changes. However, because the engine is running, it should be understood that the fuel level is continuously decreasing. Therefore, the controller must update the fuel level recurrently in order to determine fuel level changes. At step 70, the controller updates the initial fuel level and the method 50 continues to step 72. At step 72, the controller determines the current fuel level and determines whether the current fuel level is greater than or equal to a threshold fuel level. The threshold fuel level is based on the most recent initial fuel level. If the current fuel level is not greater than or equal to the threshold fuel level, the controller determines that fuel was not added to the fuel tank and the method 50 continues to step 70. The method 50 repeats steps 70 and 72 as necessary to determine if fuel is added to the fuel tank while the engine is running. It is to be understood that steps 70 and 72 can be repeated continuously, after a predetermined event, or at any other suitable interval. Alternatively, step 72 may be repeated according to criteria independent of step 70. For example, step 70 may be repeated continuously, and then suspended during conditions in which refueling is likely to occur. While step 70 is suspended, step 72 is repeated. In one embodiment, the controller continuously updates the initial fuel level while the engine speed is above a particular threshold, and holds the initial fuel level when the engine speed is below the threshold. As long as the engine speed is below the threshold, the controller continues to check the current fuel level and compare the current fuel level to the initial fuel level. The controller may repeat steps 70 and 72 in any manner suitable to determine a change in fuel level during operation of the automotive vehicle.

If the controller determines that the current fuel level is greater than or equal to the threshold fuel level, the method 50 continues to step 74. At step 74, the controller stores a value that indicates that the fuel level changed and the method 50 continues to step 76. Although the preferred embodiment includes step 76, it is to be understood that in other embodiments the method 50 may omit step 76 and continue directly to step 78. In step 76, the controller provides an indication to the driver and/or passenger that the engine is running while fuel is being added to the fuel tank. Alternatively, the controller may shut down the engine if the controller determines that fuel is being added to the tank while the engine is running. After the controller determines that the fuel level changed in either step 64 or 74, the method 50 terminates at step 78. Subsequently, if the controller detects certain leak conditions, the controller may warn the driver that the fuel cap is loose or missing.

Figure 3A:
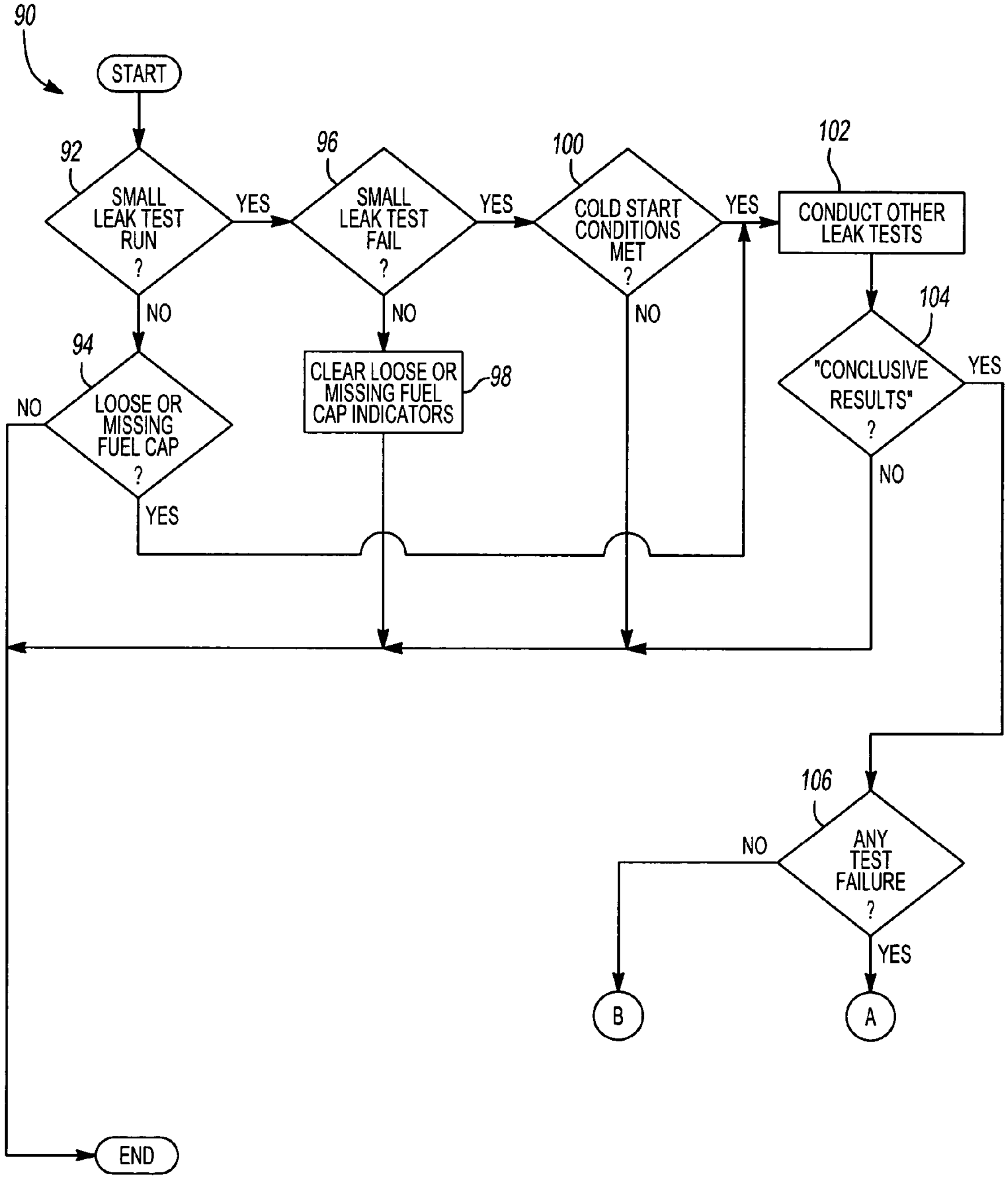
FIGS. 3A and 3B present a flow diagram of a loose or missing fuel cap diagnostic method according to the present invention.
Figure 3B:
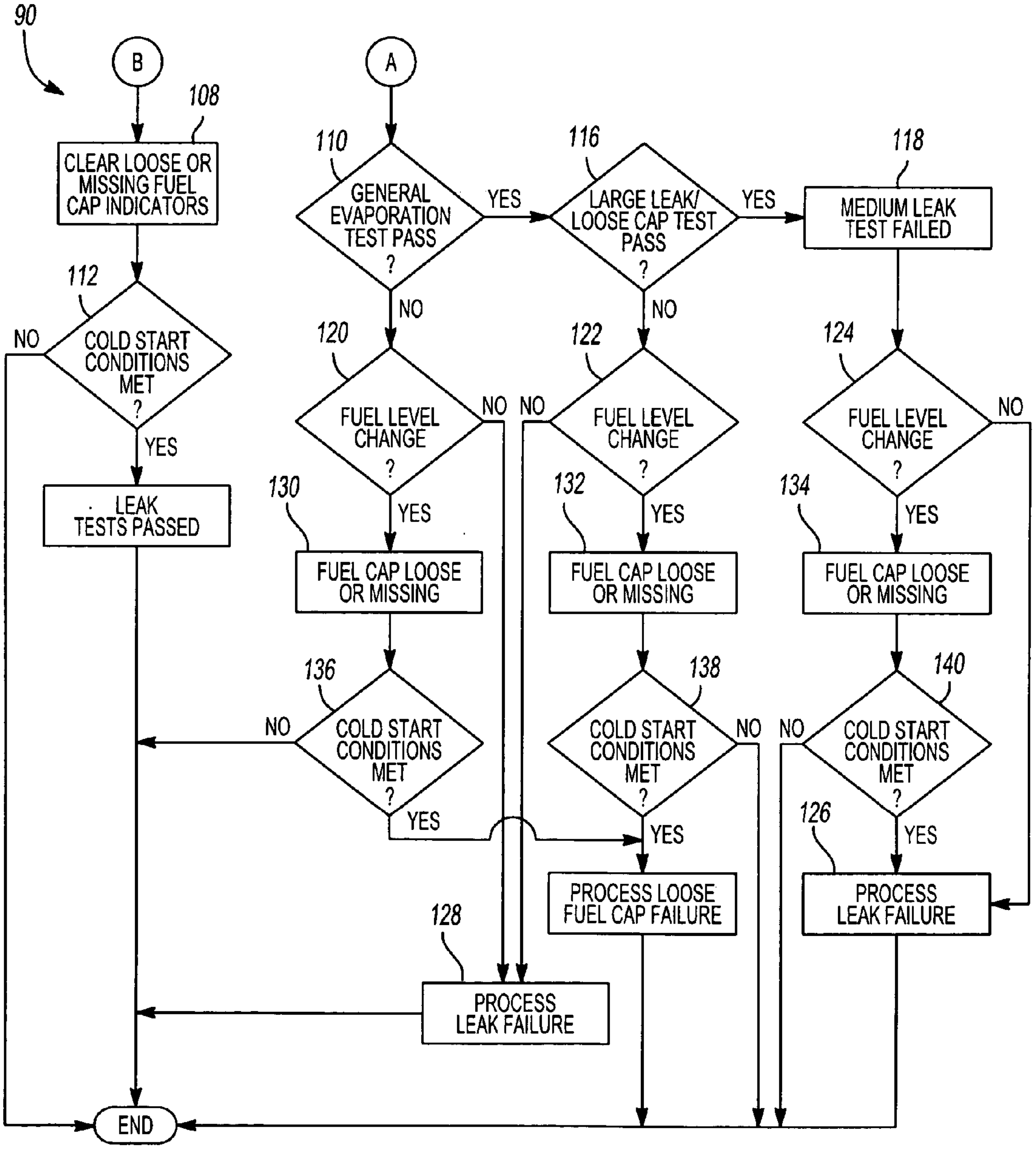

Referring now to FIGS. 3A and 3B, a loose or missing fuel cap diagnostic method 90 is shown. If the controller detects a leak in the evaporative emission control system, the controller then determines if the leak is the result of a loose or missing fuel cap. The controller collects preliminary data in order to determine whether system conditions are suitable for concluding that a detected leak is a result of a loose or missing fuel cap as described below in steps 92 through 106. For example, the controller may determine if one or more of a variety of leak tests were conducted. Various diagnostic tests may be conducted in order to detect leaks of different sizes according to applicable government standards as are known in the art, such as small leaks, medium leaks, and large leaks. Typically, a loose or missing fuel cap will result in a large leak detection. In step 92, the controller determines if a small leak diagnostic test was run during the last engine shutdown. If the small leak test was not run, the method 90 continues to step 94. If the small leak test was run, the method 90 continues to step 96. At step 94 the controller determines if a loose or missing fuel cap condition was diagnosed previously. For example, the controller may check the status of a bit, flag, or other indicator as is known in the art. If a loose or missing fuel cap condition was not diagnosed previously, the controller determines that the fuel cap is not loose or missing and the method 90 terminates. In other words, the controller determines that there is no present leak, and no previous loose or missing fuel cap condition existed. If a loose or missing fuel cap condition was diagnosed previously, the method 90 continues to step 102.

At step 96, the controller determines if the small leak test failed, indicating the presence of a small leak in the evaporative emission control system. If the small leak test did not fail, the method 90 continues to step 98. At step 98, the controller clears any bits or flags that indicate that the fuel level changed or that the fuel cap is loose or missing and the method 90 terminates. If the controller determines that the small leak test did fail, the method 90 continues to step 100. At step 100, the controller determines if certain cold start conditions are met. Typically, cold start conditions are met the first instance that the engine is powered on for a particular day. In this manner, the method 90 ensures that the controller does not continuously initiate a loose or missing fuel cap indication throughout a particular day. However, if cold start conditions are met at step 100, and/or a previous loose or missing fuel cap condition existed based on step 94, the method 90 is operable to either clear the previous loose or missing fuel cap condition and/or diagnose a new loose or missing fuel cap condition as described below. If the controller determines that cold start conditions are not met, the method 90 terminates. If the controller determines that cold start conditions are met, the method 90 continues to step 102.

At step 102, the controller conducts a medium leak, large leak, and/or other general evaporative emission control system leak test. At step 104, the controller determines if any test results were inconclusive. If the test results were inconclusive, the method 90 terminates. If the test results conclusively indicated a pass or failure of a leak test, the method 90 continues to step 106. At step 106, the controller determines if any leak test failed. If no leak tests failed, the method 90 continues to step 108. If one or more leak tests failed, the method 90 continues to step 110. At step 108, the controller clears any bits or flags that indicate that the fuel level changed or that the fuel cap is loose or missing. In other words, because no leak tests failed, the controller concludes that fuel cap is not loose or missing, and the method 90 continues to step 112. At step 112, the controller determines if cold start conditions were met previously in the method 90. If cold start conditions were not met, the method 90 terminates. If cold start conditions were met, the method 90 continues to step 114. At step 114, the controller determines that all leak tests passed under cold start conditions and the method 90 terminates.

The remainder of the method 90 determines which leak test failed, and whether the circumstances of the leak test failure indicate a loose or missing fuel cap. Steps 110, 116, and 118 determine whether the general evaporative system leak test, the large leak test, or the medium leak test failed. If the controller determines that the general evaporative system leak test failed, the method 90 continues to step 120. If the controller determines that the large leak test failed, the method 90 continues to step 122. It should be understood that for the purposes of the present invention, the large leak test is analogous to a loose or missing fuel cap test. Because a large leak in the presence of a fuel level change is indicative of a loose or missing fuel cap test, the large leak test may also be referred to as a loose fuel cap test. If neither the general evaporative system leak test nor the large leak test failed, then the controller determines that the medium leak test failed at step 118, and the method continues to step 124.

In steps 120, 122, and 124, the controller determines if the fuel level changed according to the method described in reference to FIG. 2. If the fuel level did not change, the controller processes a leak failure rather than indicating a loose or missing fuel cap to the driver. If the fuel level did not change at step 120, the controller processes a general evaporative system leak failure at step 126 and the method 90 terminates. For example, the controller stores data indicative of a general evaporative system leak failure, such as setting a bit or flag as is known in the art. If the fuel level did not change at step 122 or 124, the controller processes a medium leak failure at step 128 and the method 90 terminates.

If the fuel level did change at any of steps 120, 122, or 124, the controller determines that the fuel cap is loose or missing at steps 130, 132, and 134, respectively. Further, the controller stores data indicative of a loose or missing fuel cap. The controller may use this data during subsequent iterations of the method 90, such as in step 94. The controller may provide an external warning to the driver. For example, the controller may provide a visual indication, such as a message or warning LED, to the driver. After any of steps 130, 132, or 134, the method 90 continues to steps 136, 138, or 140, respectively. At steps 136, 138, and 140, the controller determines if cold start conditions were met. If cold start conditions were met, the method 90 terminates. If the controller determines that cold start conditions were met at steps 138 or 140, the controller processes a loose or missing fuel cap failure at step 142 and the method 90 terminates. If the controller determines that cold start conditions were met at step 136, the controller continues to step 126.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A loose or missing fuel cap detection method for an evaporative emission control system of an automotive vehicle, the method comprising:

running a fuel level change diagnostic to determine if a refueling event occurred;

determining if one or more cold start conditions are met;

running one or more leak tests on the system to determine if one or more leaks is present; and storing data that is indicative of a loose or missing fuel cap if the one or more leaks is present and the refueling event occurred.

2. The method of claim 1 further comprising indicating to a driver that a fuel cap is loose or missing.

3. The method of claim 2 wherein the step of indicating includes activating a driver visual indicator.

4. A fuel level change detection method for an automotive vehicle, the method comprising:

shutting off an engine of the automotive vehicle;

storing an initial fuel level that is indicative of a fuel level in a fuel tank of the automotive vehicle;

turning on the engine;

delaying for a first period;

determining a current fuel level;

calculating a fuel level change based on the initial fuel level and the current fuel level;

determining if the fuel level change is greater than or equal to a fuel change threshold; and storing data that indicates that a refueling event occured if the fuel level change is greater than or equal to the fuel change threshold.

5. The method of claim 4 further comprising:

updating the initial fuel level if the fuel level change is not greater than or equal to the fuel change threshold;

updating the current fuel level;

calculating an updated fuel level change based on the updated initial fuel level and the updated current fuel level;

determining if the updated fuel level change is greater than or equal to the fuel change threshold; and storing data that indicates that a refueling event occurred if the updated fuel level change is greater than or equal to the fuel change threshold.

6. The method of claim 5 wherein the step of updating the initial fuel level includes updating the initial fuel level after a first period.

7. The method of claim 5 wherein the step of updating the initial fuel level includes updating the initial fuel level when a speed of the engine is greater than or equal to an engine speed threshold.

8. The method of claim 7 wherein the step of updating the current fuel level includes updating the current fuel level when the speed of the engine is not greater than or equal to the engine speed threshold.

9. The method of claim 5 further comprising:

running one or more leak tests on an evaporative emission control system of the automotive vehicle to determine if a leak is present; and indicating that a fuel cap of the fuel tank is loose or missing if the leak is present and the data indicates that a refueling event occurred.

10. The method of claim 9 wherein the one or more leak tests include at least one of a small leak test, a medium leak test, and a large leak test.

11. The method of claim 9 wherein the step of indicating includes activating a driver visual indicator.

* * * * *